(12) United States Patent
Epshteyn et al.

(10) Patent No.: US 7,325,737 B2
(45) Date of Patent: Feb. 5, 2008

(54) METHODS AND APPARATUS FOR IDENTIFYING CANDIDATE BARCODE FIELDS

(75) Inventors: Alan J. Epshteyn, Mille Place, NY (US); David Koch, Islip, NY (US); Thomas F. Boehm, Medford, NY (US); Alan J. Livingston, Lindenhurst, NY (US); Joseph Boriotti, East Northport, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 217 days.

(21) Appl. No.: 11/291,187

(22) Filed: Nov. 30, 2005

(65) Prior Publication Data
US 2007/0119939 A1     May 31, 2007

(51) Int. Cl.
*G06K 5/04* (2006.01)

(52) U.S. Cl. ................... 235/462.08; 235/462.01; 235/462.15; 235/462.41

(58) Field of Classification Search ......... 235/462.08, 235/462.14, 462.15, 462.24, 462.41, 459
See application file for complete search history.

(56) References Cited

U.S. PATENT DOCUMENTS

| 5,296,690 A | * | 3/1994 | Chandler et al. | ........ 235/462.1 |
| 5,304,787 A | * | 4/1994 | Wang | ............... 235/462.09 |
| 7,050,631 B2 | * | 5/2006 | Bian et al. | ............... 382/183 |

* cited by examiner

*Primary Examiner*—Seung Ho Lee
(74) *Attorney, Agent, or Firm*—Ingrassia Fisher & Lorenz, P.C.

(57) ABSTRACT

A system is provided for selecting a particular barcode on an item that includes multiple barcodes. The system (1) acquires, via a barcode imager, an image of the item within the field of view of the barcode imager, (2) analyzes the acquired image to determine a set of potential barcode fields, (3) determines, using a predetermined criterion (e.g., distance from center of imaged area, type of bar code, etc.), a candidate barcode field from among the set of potential barcode fields, (4) displays a modified image derived from the acquired image, wherein the candidate barcode field is identified within the modified image, and (5) allows the user to initiate a decode session when the candidate barcode field includes the desired barcode. The acquired may be modified to highlight the candidate barcode field in any number of ways, including, for example, superimposing an artificial reticule around the candidate field, superimposing an artificial scan line over the field, altering the contrast of the field, and/or altering the brightness of the field.

15 Claims, 5 Drawing Sheets

METHODS AND APPARATUS FOR IDENTIFYING CANDIDATE BARCODE FIELDS

TECHNICAL FIELD

The present invention generally relates to barcode reading devices and, more particularly, to methods for selecting a target barcode from among a large number of barcodes printed on an item.

BACKGROUND

Barcode scanners and imagers are used to scan and decode visual indicia (e.g., "barcodes") attached to products and the like. In many cases, an item or an item's packaging includes many different barcodes having any number of symbologies, giving rise to mixed-use requirements. Furthermore, when it is inconvenient to place a barcode on the item itself, it is common to assemble a "pick sheet" of barcodes—i.e., a sheet of paper or the like upon which a large number of barcodes are assembled in row/column form.

While hand-held and portable scanners are easy to aim, and typically include some form of aiming aid, many scanners are stationary. A stationary scanner is one in which the scanning or imaging component is rigidly attached to a base or structure such that its orientation and position are substantially fixed. Stationary scanners are often seen, for example, at check-out counters and other such locations.

It is very difficult to use a stationary scanner to select a particular barcode from among a number of barcodes present on a pick sheet or other item, as such scanners lack any form of aiming capability. Incorporating a mechanical aiming feature into a stationary scanner is expensive and largely defeats the purpose of having a stationary scanner.

Accordingly, there is a need for systems and methods that allow a user to easily and quickly select a particular barcode on an item having more than one barcode, especially in cases where the barcode scanner is stationary.

BRIEF SUMMARY

A barcode imaging system in accordance with the present invention allows an operator to interactively select a particular barcode from a plurality of barcodes printed on an item by providing an image that highlights or otherwise identifies the candidate barcode to the user, who can then move the item to alter the field of view or otherwise select the target barcode field.

The above and other aspects of the invention may be carried out in one form by a system that: (1) acquires, via a barcode imager, an image of the item within the field of view of the barcode imager, (2) analyzes the acquired image to determine a set of potential barcode fields, (3) determines, using a predetermined criterion (e.g., distance from center of imaged area, type of bar code, etc.), a candidate barcode field from among the set of potential barcode fields, (4) displays a modified image derived from the acquired image, wherein the candidate barcode field is identified within the modified image, and (5) allows the user to initiate a decode session when the candidate barcode field includes the desired barcode. The acquired image may be modified to highlight the candidate barcode field in any number of ways, including, for example, superimposing an artificial reticule around the candidate field, superimposing an artificial scan line over the field, altering the contrast of the field, and/or altering the brightness of the field.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the invention or the application and uses of the invention. Furthermore, there is no intention to be bound by any expressed or implied theory presented in the preceding technical field, background, brief summary or the following detailed description.

The invention may be described herein in terms of functional and/or logical block components and various processing steps. It should be appreciated that such block components may be realized by any number of hardware, software, and/or firmware components configured to perform the specified functions.

Figure 1:
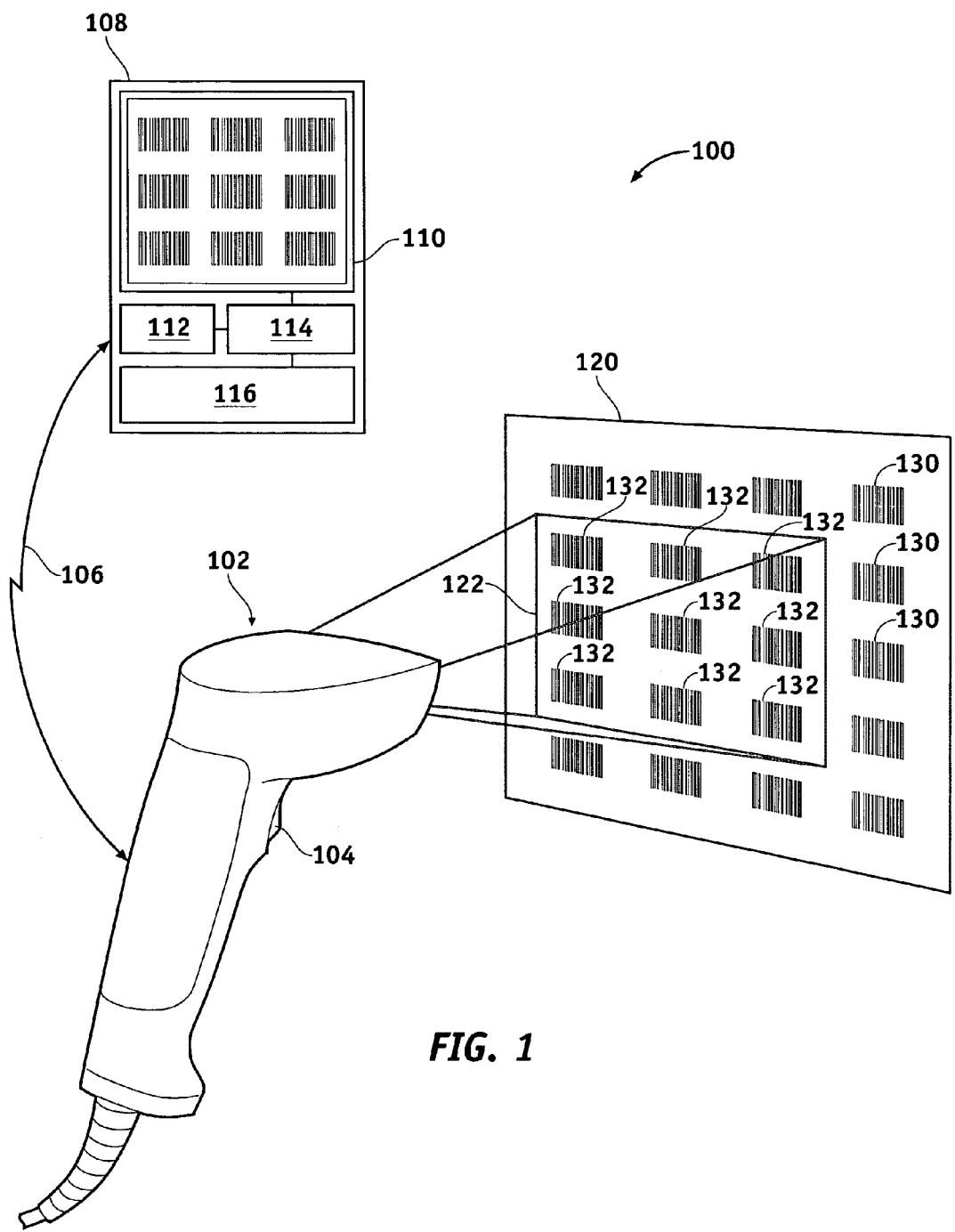
FIG. 1 is an overview of a barcode imaging system useful in describing the present invention.

Referring to FIG. 1, an imaging system 100 generally includes a scanner (or "barcode reader") 102, a terminal 108, and a communication link 106 between scanner 102 and terminal 108. Scanner 102 scans an area 122 of an item 120 within its field of view, wherein item 120 includes one or more visual indicia 130 (referred to herein, without limitation, as simply "barcodes").

A subset of barcodes 120 (i.e., barcodes 132) fall within field of view 122, and are thus imaged by scanner 102. In a "viewfinder mode," terminal 108 is configured to display an image on display 110 that corresponds to scanned area 122. In one embodiment, scanner 102 is of the stationary type (i.e., lacking an aiming ability). Accordingly, a candidate barcode field (or multiple such fields) is highlighted or otherwise indicated on display 110 such that the user may move item 120 or otherwise select the desired barcode prior to initiating a decode session.

Scanner 102 comprises any suitable scanning or imaging device capable of reading printed indicia and creating an electronic representation (or "data") associated with that image. Such scanners feature, for example, charge coupled device (CCD) image sensors, CMOS imaging devices, laser scanners, etc. Scanner 102 might include some form of trigger 104 that allows the user to initiate a decode event. While trigger 104 is shown in this embodiment as being integral with scanner 102, it will be appreciated that a decode event may be initiated by any number of different actuators, and may be located at any convenient location (including, for example, at terminal 108, or at a stand-alone computer.

Scanner 102 includes any number of known optical components, such as lasers, mirrors, CCD, devices, lenses, and the like. Scanner 102 also includes suitable electronics necessary to carry out the functions described herein. For example, scanner 102 may include various microprocessors, memory, and input/output components (not shown in FIG. 1).

Terminal 108 preferably includes a processor 114, a memory 112, an input device 116 (e.g., a keyboard, a keypad, a pointing device, or a combination thereof), and a display 110 (e.g., an liquid crystal display (LCD), or the like). Terminal 108 is configured to communicate with scanner 102 and process image data received over communication link 106. Display 110 is used to display an image and/or other data produced during operation of scanner 102, as described below, and is capable of interacting with a user in conjunction with input device (or devices) 116.

Terminal 108 may be a portable device, or may be incorporated into a larger system, for example, a personal computer or the like. Alternatively, terminal 108 may be integrated into scanner 102 itself, with display 110 and input device 116 being located on the housing or any convenient region of scanner 102. It will be understood that terminal 108 may include any number of additional electronic components typically associated with hand-held computer devices. Such conventional components and electronics will not be described in detail herein.

Communication link 106 comprises any wireless or hard-wired connection utilizing any suitable protocol now known or later developed. This interface may conform to any suitable interface scheme, including, for example, RS232, Keyboard Wedge, Wand Emulation, Scanner Emulation, IBM 468X/469X, USB or Synapse.

Figure 2:
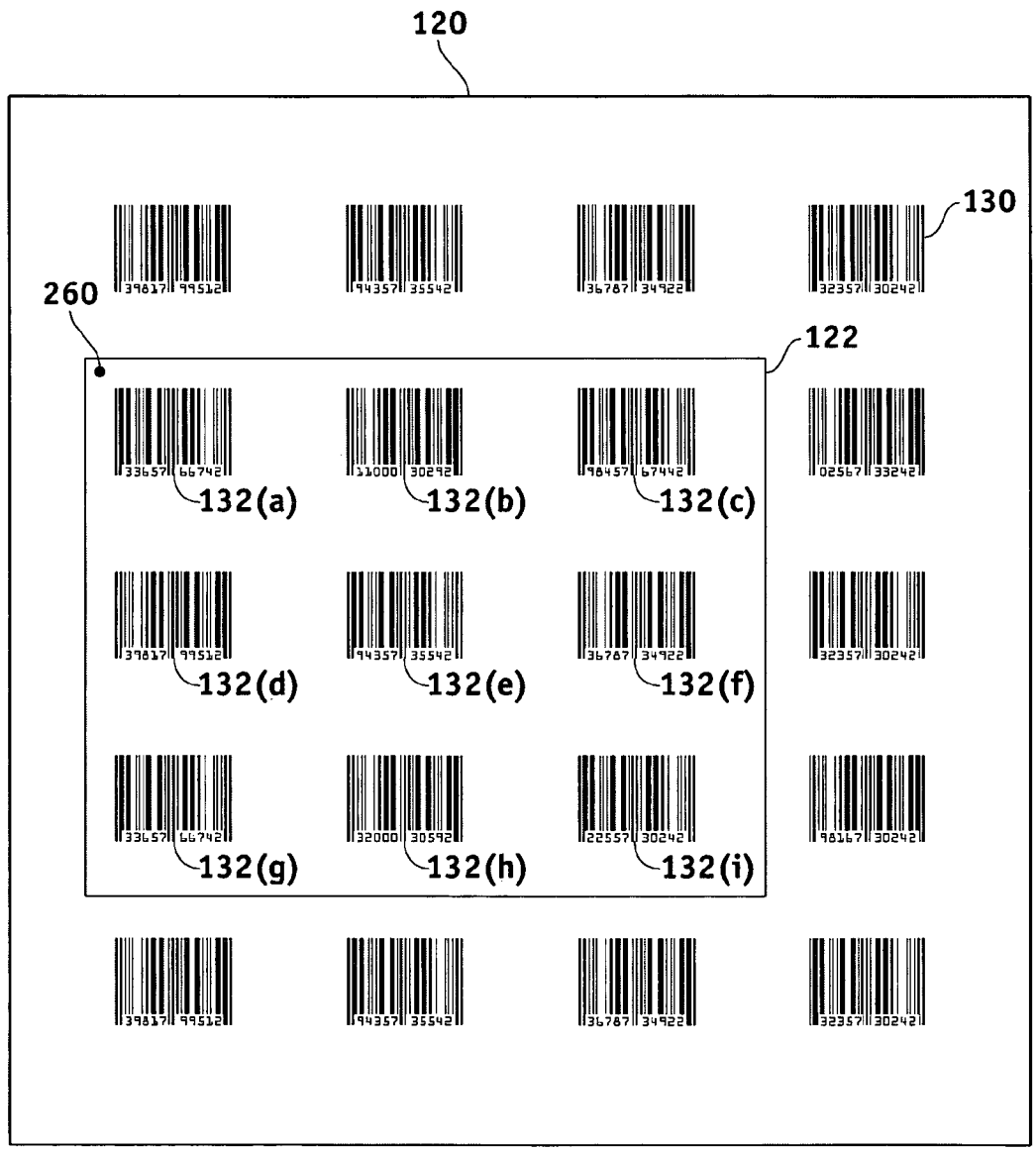
FIG. 2 is an exemplary item including multiple barcodes.

FIG. 2 shows an exemplary item 120 having a number of bar codes 130 provided thereon, wherein certain barcodes 132(*a*)-(*i*) fall within field of view 122 of the scanner. Barcodes 132 are referred to as "potential barcodes" in that each of the barcodes within the field of view are potentially intended to be scanned by the user. That is, the user may intend to scan any of the discrete barcodes within field of view 122. The target barcode (e.g., 132(*e*)), is referred to as the "desired barcode," and the area including and immediately surrounding a barcode is referred to as the "barcode field." While barcodes 130 are illustrated as being of the same type (e.g., a particular one-dimensional code), the present invention is not so limited. Typical real-world items often include any number of different barcode types.

Having thus given an overview of the various components of the present invention, an exemplary method for selecting a particular barcode from among a set of potential barcodes will now be described.

Figure 4:
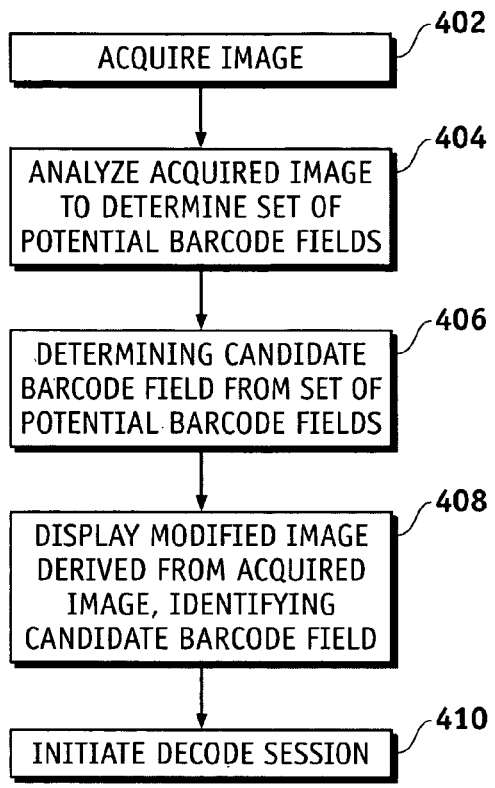
FIG. 4 is a flow-chart depicting an exemplary process in accordance with one embodiment of the present invention.

Referring to the flowchart shown in FIG. 4 in conjunction with the system overview shown in FIG. 1, scanner 102 first acquires an image of the item within the field of view 122 of the barcode reader (step 402). In the illustrated example, as described above, item 120 has a plurality of barcodes 130 provided thereon, and barcode reader 102 is of the stationary type.

It will be understood that the use of the term "barcode" is not meant to limit the range of possible symbologies for which the present invention is applicable. Barcodes 130 may include a visual representation of any code now known or later developed. Example symbologies now in use include various one-dimensional codes (e.g., UPC.EAN, UCC.EAN 128, JAN 8&13, Code 39, Code 39 ASCII, Code 39 Trioptic, Code 128, Codebar NW 7, Interleaved 2 of 5, Discrete 2 of 5, Code 93, MSI, Code 11, Code 32, Bookland EAN, IATA, and UCC/EAN RSS), various two-dimensional codes (e.g., PDF417, microPDF417, MaxiCode, DataMatrix (ECC 2000), Composite Codes, and QR Code), as well as various postal codes (e.g., U.S. Postnet, U.S. Planet, U.K. Postal, Japan Postal, Australian Postal, and Dutch Postal). Furthermore, the present invention may be used in connection with optical character recognition (OCR), such that text within a field is processed by the system rather than a barcode symbol.

Next, in step 404, the system analyzes the acquired image to determine a set of potential barcode fields. This step may be performed via hardware, software, or a combination thereof, either at scanner 102 or within terminal 108. In a preferred embodiment, image analysis is substantially performed by software residing within terminal 108 and executed by processor 114. As shown in FIG. 2, this step involves identifying each potential barcode 132(*a*)-(*i*), and each corresponding barcode field, within field of view 122. This step may be performed using conventional image processing and pattern recognition methods.

In step 406, the system determines, using a predetermined criterion, a candidate barcode field from among said set of potential barcode fields. A variety of criteria may be used. For example, in one embodiment, the system determines which barcode field is closest to the center 250 of field of view 122. In another embodiment, the system determines which barcode field is closest to the upper left corner 260 of field of view 122. Similarly, any other spatial or geometric criterion may be used.

The system may also use a criterion based upon the type of codes present within field of view 122. For example, the user may desire to read only two-dimensional barcodes and ignore one-dimensional codes. The user might also desire to read only a specific type of code and ignore all others.

Regardless of the criterion used, the system determines a candidate barcode field from the set of all barcode fields identified within the field of view. The system then displays a modified image (on display 110) derived from the acquired image, wherein said candidate barcode field is identified within said modified image (step 408).

The candidate barcode field may be identified in any number of ways. FIGS. 3A-3D show example highlighting methods corresponding to exemplary images displayed on display 110 of terminal 108 during a viewfinder mode.

Figure 3A:
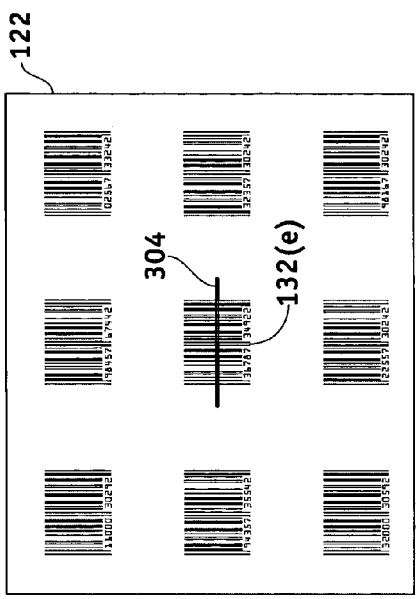
FIGS. 3A-3D depict various methods of identifying a candidate barcode field on an item such as that shown in FIG. 2.

FIG. 3A shows an embodiment wherein the desired barcode 132(*e*) is identified by an artificial reticle (in this illustration, a rectangular region surrounding the barcode field). Any other artificial reticle may be displayed.

Figure 3C:
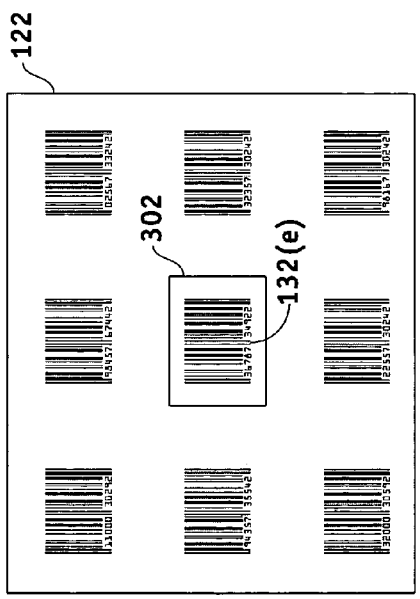
Figure 3B:
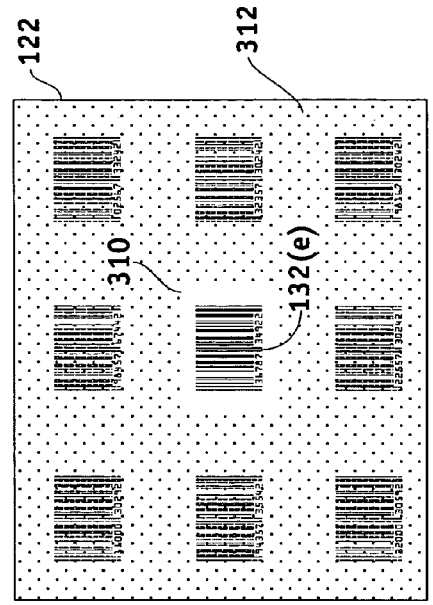

In another embodiment, shown in FIG. 3B, an artificial scan line 304 is used. This artificial scan line is meant to simulate the typical one-dimensional laser pattern generated and projected onto one-dimensional barcodes by traditional scanners. Such an identification method is advantageous in that it is highly intuitive to users who have experience with such scanning systems.

FIG. 3C shows an embodiment wherein the brightness of the candidate barcode region corresponding to barcode 132(*e*) is set at a higher level than that of the surrounding region 308. The inverse scheme may also be used—i.e., a modified image wherein the candidate barcode field is darker than the surrounding area.

FIG. 4C shows yet another embodiment wherein the contrast of the barcode field surrounding barcode 132(*e*) is increased (and/or the surrounding area 312 is reduced) to highlight the desired barcode. In yet another embodiment, a cross-hair is displayed in the center of the display area (or some other location), and the user can move the item around such that the center of the cross-hair falls on the desired barcode.

Figure 3D:
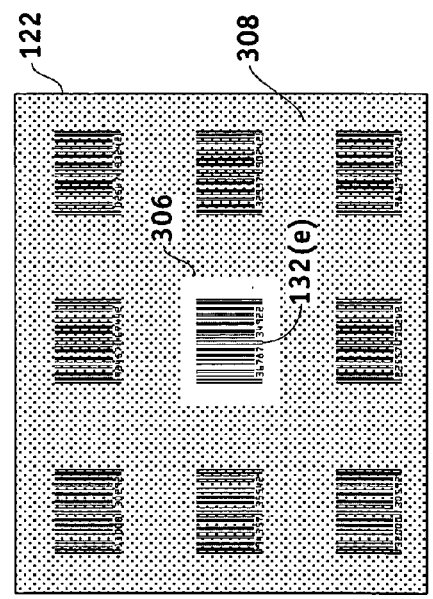

It will be appreciated that the example identification methods listed above are in no way limiting, and that the present invention contemplates any type of identification scheme involving generation and display of a modified image. The modified image displayed to the user might involve the addition of additional graphical features (such as those shown in FIGS. 3A and 3B), selective transformations of the acquired image (through the use of color differences, or contrast/brightness as shown in FIGS. 3C and 3D), or any other image processing technique.

Finally, in step 410, the system allows a user to initiate a decode session when said candidate barcode field includes the desired barcode. As mentioned previously, the decode session may be initiated via a user controlled trigger (104 in FIG. 1), or any other manual or automatic method.

In accordance with another embodiment of the present invention, one or more of the identification schemes described above are used to identify multiple potential barcodes, and the user is then given the opportunity to select one of the identified barcode fields using, for example, the input device 116 of terminal 108 (which might include a touch-screen incorporated into display 110, and/or a cursor that can be repositioned on the screen). Alternatively, the trigger 104 may be used to indicate selection, using a "deeper" or multi-level press, or using release of the trigger itself as the selection method. In this embodiment, there is no "predetermined criterion" per se known by the system ahead of time; the user determines which barcode is selected.

Figure 5:
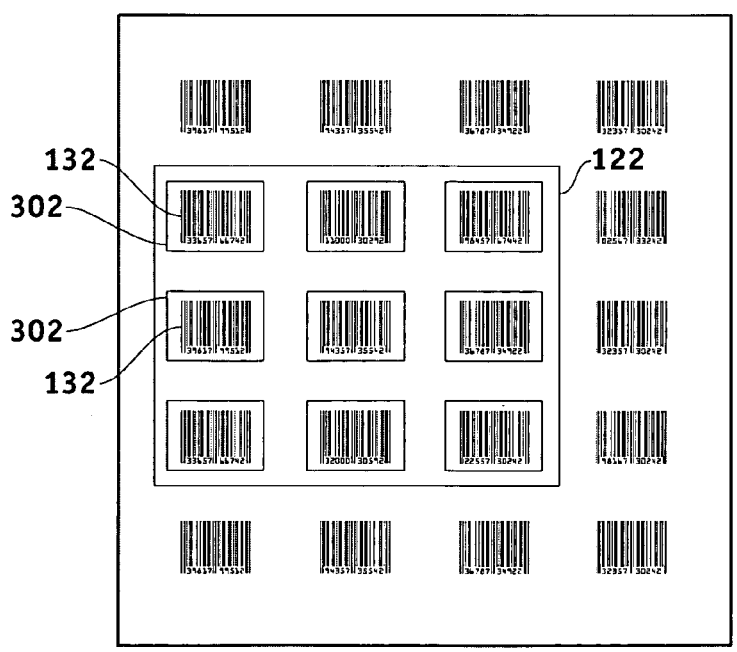
FIG. 5 is an exemplary item including multiple barcodes and multiple candidate barcode fields.
Figure 6:
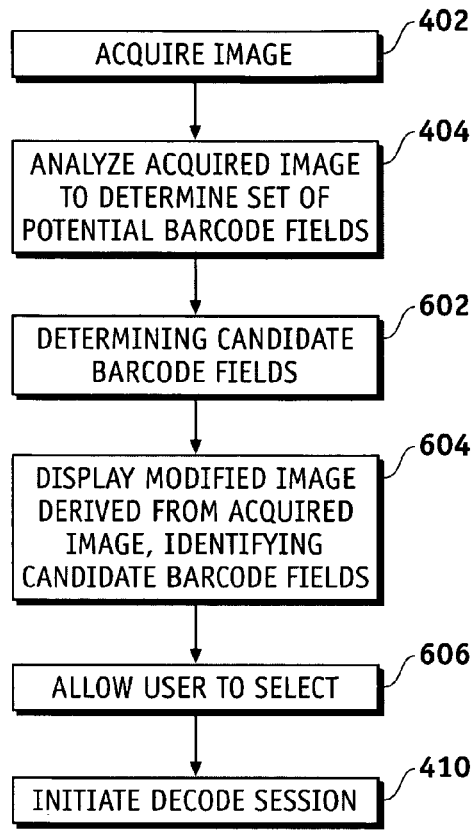
FIG. 6 is a flow-chart depicting an alternate embodiment of the present invention.

More particularly, referring to FIGS. 5 and 6, multiple barcodes 132 are identified using artificial reticules 302 or any other method described above. All of the candidate barcode fields are determined (step 602), then the modified image, identifying the candidate barcode fields, is displayed for the user (step 604), allowing the user to select a particular barcode 132 (step 606) prior to decode. Such an embodiment is useful in cases wherein the scanner is stationary and the item being scanned is too large or cumbersome to be repositioned.

Figure 7:
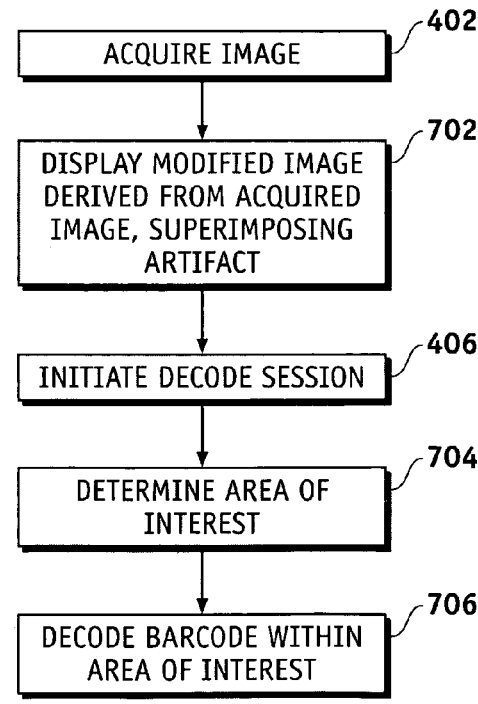
FIG. 7 is a flow-chart depicting yet another embodiment of the present invention.

In an alternate embodiment, depicted in FIG. 7, an artifact (e.g., a cross-hair or other such graphic) is superimposed upon the acquired image, and then the system later determines which barcode to decode based on the position of the artifact. More particularly, referring to FIG. 7, the system first acquires the image, then displays a modified version of the image with a superimposed artifact (702). When the user initiates a decode session (410), the system then determines an area of interest (704), then decodes the barcode that area of interest (706). The area of interest is preferably based on the position and nature of the artifact within group of possible barcodes identified by the system. For example, the system might select an area of interest that encompasses the barcode field nearest to the center of the artifact. It will be understood, however, that any other such identification method may be used.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. A method for decoding a desired barcode affixed to an item having a plurality of barcodes provided thereon, said method comprising the steps of:

acquiring, via a barcode imager, an image of the item within a field of view of said barcode imager;

analyzing said acquired image to determine a set of potential barcode fields;

determining, using a predetermined criterion, a candidate barcode field from among said set of potential barcode fields;

displaying a modified image derived from said acquired image, wherein said candidate barcode field is identified within said modified image; and allowing a user to initiate a decode session when said candidate barcode field includes the desired barcode.

2. The method of claim 1, wherein said predetermined criterion is the distance from the center of said field of view.

3. The method of claim 1, wherein said predetermined criterion is the type of barcode encoding scheme.

4. The method of claim 1, wherein said displaying step includes the step of identifying said candidate barcode field by superimposing an artificial reticule over said candidate barcode field.

5. The method of claim 1, wherein said displaying step includes the step of identifying said candidate barcode field by superimposing an artificial scan line over said candidate barcode field.

6. The method of claim 1, wherein said displaying step includes the step of identifying said candidate barcode field by altering the relative brightness of the candidate barcode field within said modified image.

7. The method of claim 1, wherein said displaying step includes the step of identifying said candidate barcode field by altering the relative contrast of the candidate barcode field within said modified image.

8. A barcode imaging system comprising:

a barcode imager configured to acquire an image of an item within a field of view of said barcode imager and to allow a user to initiate a decode session;

a processor communicatively coupled to the barcode imager, said processor configured to: analyze said acquired image to determine a set of potential barcode fields;

determine, using a predetermined criterion, a candidate barcode field from among said set of potential barcode fields; and a display communicatively coupled to said processor, said display configured to display a modified image derived from said acquired image, wherein said candidate barcode field is identified within said modified image.

9. The system of claim 8, wherein said predetermined criterion is the distance from the center of said field of view.

10. The system of claim 8, wherein said predetermined criterion is the type of barcode encoding scheme.

11. The system of claim 8, wherein said modified image includes an artificial reticule superimposed over said candidate barcode field.

12. The system of claim 8, wherein said modified image includes an artificial scan line superimposed over said candidate barcode field.

13. The system of claim 8, wherein the relative brightness of the candidate barcode field is altered within said modified image.

14. The method of claim 8, wherein the relative contrast of the candidate barcode field is altered within said modified image.

15. The method of claim 8, wherein the color of the candidate barcode field is altered within said modified image.

\* \* \* \* \*

UNITED STATES PATENT AND TRADEMARK OFFICE
CERTIFICATE OF CORRECTION

PATENT NO. : 7,325,737 B2
APPLICATION NO. : 11/291187
DATED : February 5, 2008
INVENTOR(S) : Epshteyn et al.

Page 1 of 1

It is certified that error appears in the above-identified patent and that said Letters Patent is hereby corrected as shown below:

In Column 6, Line 60, in Claim 14, delete "method" and insert -- system --, therefor.

In Column 6, Line 63, in Claim 15, delete "method" and insert -- system --, therefor.

Signed and Sealed this

Seventeenth Day of November, 2009

David J. Kappos
*Director of the United States Patent and Trademark Office*